United States Patent
Chang et al.

(10) Patent No.: US 9,527,773 B2
(45) Date of Patent: Dec. 27, 2016

(54) GRAPHENE-CERAMIC HYBRID COATING LAYER, AND METHOD FOR PREPARING THE SAME

(71) Applicants: Hyundai Motor Company, Seoul (KR); Korea Institute of Ceramic Engineering and Technology, Seoul (KR)

(72) Inventors: Kwang Il Chang, Gyeonggi-do (KR); Chul Kyu Song, Seoul (KR); Dha Hae Kim, Gangwon-do (KR); Seung Hun Hur, Seoul (KR)

(73) Assignees: Hyundai Motor Company, Seoul (KR); Korea Institute of Ceramic Engineering and Technology, Jinju, Gyeongsangnam-Do (KR)

( * ) Notice: Subject to any disclaimer, the term of this patent is extended or adjusted under 35 U.S.C. 154(b) by 221 days.

(21) Appl. No.: 14/144,184

(22) Filed: Dec. 30, 2013

(65) Prior Publication Data
US 2015/0110972 A1    Apr. 23, 2015

(30) Foreign Application Priority Data
Oct. 22, 2013 (KR) .................. 10-2013-0125885

(51) Int. Cl.
*B05D 1/00* (2006.01)
*C04B 35/01* (2006.01)
(Continued)

(52) U.S. Cl.
CPC .......... *C04B 35/013* (2013.01); *B05D 1/005* (2013.01); *B05D 1/02* (2013.01); *B05D 1/18* (2013.01);
(Continued)

(58) Field of Classification Search
CPC .......... B05D 1/005; B05D 1/02; B05D 1/18; B05D 1/28; B05D 1/30; B05D 1/40; C04B 35/013; C04B 35/14; C04B 35/46; C04B 2235/425; C03C 17/006; C03C 17/22; C03C 17/23; C03C 2218/31; C03C 2217/21
(Continued)

(56) References Cited

U.S. PATENT DOCUMENTS 8,257,867 B2    9/2012  Liu et al.
2003/0187124 A1*  10/2003  Hirata ............... B82Y 30/00
                                                    524/496
(Continued)

FOREIGN PATENT DOCUMENTS

KR    10-2012-0035659       4/2012
KR    10-2012-0039799 A     4/2012
(Continued)

*Primary Examiner* — Kirsten Jolley
(74) *Attorney, Agent, or Firm* — Mintz Levin Cohn Ferris Glovsky and Popeo, P.C.; Peter F. Corless (57) ABSTRACT

Disclosed are a graphene-ceramic hybrid coating layer formed from a graphene-ceramic hybrid sol solution including graphene (RGO: reduced graphene oxide) and a ceramic sol, wherein the graphene content in the graphene-ceramic hybrid coating layer is about 0.001 wt % to about 1.8 wt % based on the total weight of the graphene-ceramic hybrid coating layer, and a method for preparing the same.

10 Claims, 9 Drawing Sheets
(5 of 9 Drawing Sheet(s) Filed in Color)

(51) Int. Cl.
  *B05D 1/02*  (2006.01)
  *B05D 1/18*  (2006.01)
  *B05D 1/28*  (2006.01)
  *B05D 1/30*  (2006.01)
  *C04B 35/14* (2006.01)
  *C04B 35/46* (2006.01)
  *C03C 17/00* (2006.01)
  *C03C 17/22* (2006.01)

(52) U.S. Cl.
  CPC ............... *B05D 1/28* (2013.01); *B05D 1/305* (2013.01); *C03C 17/006* (2013.01); *C03C 17/22* (2013.01); *C04B 35/14* (2013.01); *C04B 35/46* (2013.01); *C03C 2218/31* (2013.01); *C04B 2235/425* (2013.01)

(58) Field of Classification Search
  USPC .................. 427/240, 427, 428.01, 430.1
  See application file for complete search history.

(56) References Cited

U.S. PATENT DOCUMENTS

| | | | |
|---|---|---|---|
| 2007/0092432 A1* | 4/2007 | Prud'Homme | C01B 31/043 423/448 |
| 2010/0323178 A1* | 12/2010 | Ruoff | C04B 35/14 428/220 |
| 2012/0149554 A1 | 6/2012 | Lin et al. | |
| 2014/0299820 A1* | 10/2014 | Harandek | H01B 1/18 252/508 |

FOREIGN PATENT DOCUMENTS

| KR | 10-2012-0053399 | 5/2012 |
| KR | 10-2012-0092431 | 8/2012 |
| KR | 10-2013-0014327 A | 2/2013 |

* cited by examiner

GRAPHENE-CERAMIC HYBRID COATING LAYER, AND METHOD FOR PREPARING THE SAME

CROSS-REFERENCE TO RELATED APPLICATION

This application claims priority to and the benefit of Korean Patent Application No. 10-2013-0125885 filed in the Korean Intellectual Property Office on Oct. 22, 2013, the entire contents of which are incorporated herein by reference.

BACKGROUND OF THE INVENTION (a) Field of the Invention

The present invention relates to a graphene-ceramic hybrid coating layer and a method for preparing the same.

(b) Description of the Related Art

Graphene oxide (or graphite oxide, hereinafter GO) is a sheet-shaped carbon material prepared by acid treating graphite, and has a large amount of a hydrophilic functional group, a carboxyl group (—COOH), a hydroxyl group (—OH), and the like on the surface. The surface oxidizing groups produced through an acid treatment process naturally produce hydrogen-bonds with $H_2O$. Thus, GO is generally prepared in a form of a hydration or in a water-containing slurry state, with the solid concentration of the slurry generally being about 2 to 8 wt % as long as it is not specifically treated.

When the GO is appropriately included in a film or a structure, strength thereof may be improved and suitable thermal conductivity may be provided. However, treatment of the contained moisture may hinder properties.

In general, GO may be prepared in a form of graphene through a chemical reduction method (a hydrazine treatment and the like) and a thermal reduction method. Herein, reduced graphene is particularly referred to as reduced graphene oxide (RGO).

Evidence shows that not all of the oxidizing groups on the RGO are thoroughly removed. Generally, oxygen content of the surface oxidizing groups is less than or equal to about 5% relative to a carbon backbone.

A heterogeneous mixture of RGO and a conventional material has recently evoked active interest, due to its potential to improve synergic effects between materials exceeding that of conventional materials. The heterogeneous mixture may be used in a high strength composite material and a fuel cell. As representative technologies, Korean Patent No. KR2011-0012479 describes a graphene-nanowire (semiconductor) hybrid structure where light energy is absorbed in a graphene conductive part and electron-hole pairs are generated. Korean Patent No. KR2010-0114646 describes a hybrid composite manufacturing method including graphene sheet/carbon nanotube/a polymer nanoparticle. Korean Patent No. KR2010-0097322 describes a method of manufacturing a positive electrode graphene material for a lithium rechargeable battery that is a hybrid material formed by adding an Fe precursor and a $PO_4$ precursor. U.S. Pat. No. 8,257,867 describes a method of manufacturing a graphene composite calcinated body having an excellent charge and discharge ratio by sintering graphene and a metal oxide particle in air. U.S. Patent Publication No. 2012-0149554 describes a method of manufacturing a graphene-$TiO_2$ hybrid material by mixing a $TiO_2$ nanopowder with graphene at a high temperature and high pressure and reacting them.

However, improved materials are still needed.

SUMMARY OF THE INVENTION

According to one aspect, the present invention provides a graphene-ceramic hybrid sol solution having improved dispersion and safety. According to another aspect, the present invention provides a graphene-ceramic hybrid coating layer having improved uniformity, transparency, and thermal conductivity.

In particular, according to one embodiment, a graphene-ceramic hybrid coating layer is formed from a graphene-ceramic hybrid sol solution including graphene (RGO: reduced graphene oxide) and a ceramic sol. Preferably, a graphene content in the graphene-ceramic hybrid coating layer is about 0.001 wt % to about 1.8 wt % based on the total weight of the graphene-ceramic hybrid coating layer, and more preferably, the graphene content is about 0.01 wt % to about 1.8 wt % based on the total weight of the graphene-ceramic hybrid coating layer. The graphene and ceramic sol may be uniformly distributed in the graphene-ceramic hybrid sol solution. The ceramic may be any conventional ceramic and, according to a preferred embodiment, the ceramic is selected from the group consisting of $SiO_2$, $Al_2O_3$, $Li_4Ti_5O_{12}$, $TiO_2$, $SnO_2$, $CeO_2$, $ZrO_2$, $V_2O_5$, $B_2O_3$, $BaTiO_3$, $Y_2O_3$, $WO_3$, MgO, CuO, ZnO, $AlPO_4$, AlF, $Si_3N_4$, AlN, TiN, WC, SiC, TiC, $MoSi_2$, $Fe_2O_3$, $GeO_2$, $Li_2O$, MnO, NiO, zeolite, and combinations thereof.

According to another aspect, the present invention provides a method for preparing the graphene-ceramic hybrid coating layer.

According to various embodiments, the method includes: mixing graphene and a first dispersing agent and a first non-aqueous based solvent to prepare a dispersion including the graphene, the first dispersing agent and the first non-aqueous based solvent; adding a mixed solution of a second non-aqueous based solvent and a ceramic precursor to the dispersion to prepare a mixture; mixing a second dispersing agent and water with the mixture to prepare a graphene-ceramic hybrid sol solution; and coating a substrate with the graphene-ceramic hybrid sol solution. According to various embodiments, the method further includes performing a mechanical dispersion treatment after mixing the graphene, first dispersing agent, and first non-aqueous based solvent. The mechanical dispersion treatment may be performed by any known method, such as, for example, ultrasonication, stirring, a shear stress (shearing force) application method, a method of using a homogenizer, or a combination thereof. According to various embodiments, the first dispersing agent and second dispersing agent may each independently be polyethylene glycol (PEG), glycerol, hydrochloric acid (HCl), acetic acid, formic acid, citric acid, a binder, or a combination thereof. According to various embodiments, the first non-aqueous based solvent and the second non-aqueous based solvent are each independently be an amphiphilic solvent, a water-soluble solvent except water, a non-water-soluble solvent, a polar solvent, a nonpolar solvent, or a combination thereof. In particular, the first non-aqueous based solvent and the second non-aqueous based solvent are preferably each independently selected from isopropyl alcohol (IPA), ethanol, acetone, methylethylketone, methyl alcohol, ethyl alcohol, isopropyl alcohol, acetylacetone, butyl alcohol, ethylene glycol, polyethylene glycol, tetrahydrofuran, dimethylformamide, dimethyl acetamide, N-methyl-2-pyrrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, dimethylsulfoxide, and combinations thereof. According to various embodiments, the dispersion further includes an additive selected from polyethylene glycol, glycerin, glucose, a binder, and a combination thereof. The graphene is preferably dispersed in an amount of about 0.001 wt % to about 5 wt % based on a solid content of a mixture including the first graphene dispersing agent and non-aqueous based solvent. The coating process may be performed by any known coating process such as dip coating, spin coating, spray coating, paint coating, bar coating, flow coating, roll coating, or a combination thereof.

According to another aspect, the present invention provides a graphene-ceramic hybrid coating layer prepared by the method for preparing the graphene-ceramic hybrid coating layer.

According to various embodiments the graphene-ceramic hybrid coating layer thus prepared has a graphene content in the graphene-ceramic hybrid coating layer of about 0.001 wt % to about 1.8 wt % based on the total weight of the graphene-ceramic hybrid coating layer.

According to another aspect, the present invention provides an automobile headlamp including the graphene-ceramic hybrid coating layer.

The present invention thus provides a graphene-ceramic hybrid sol solution having improved dispersion and safety, a graphene-ceramic hybrid coating layer including the same and having improved uniformity, transparency, and thermal conductivity, and a method for preparing the same, and an automobile headlamp including the graphene-ceramic hybrid coating layer, wherein improved properties are provided.

Other features and aspects of the present invention will be apparent from the following detailed description, drawings and claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features of the present invention will now be described in detail with reference to certain exemplary embodiments thereof illustrated the accompanying drawings which are given hereinbelow by way of illustration only, and thus are not limitative of the present invention, and wherein.

DESCRIPTION OF SYMBOLS

Figure 8:
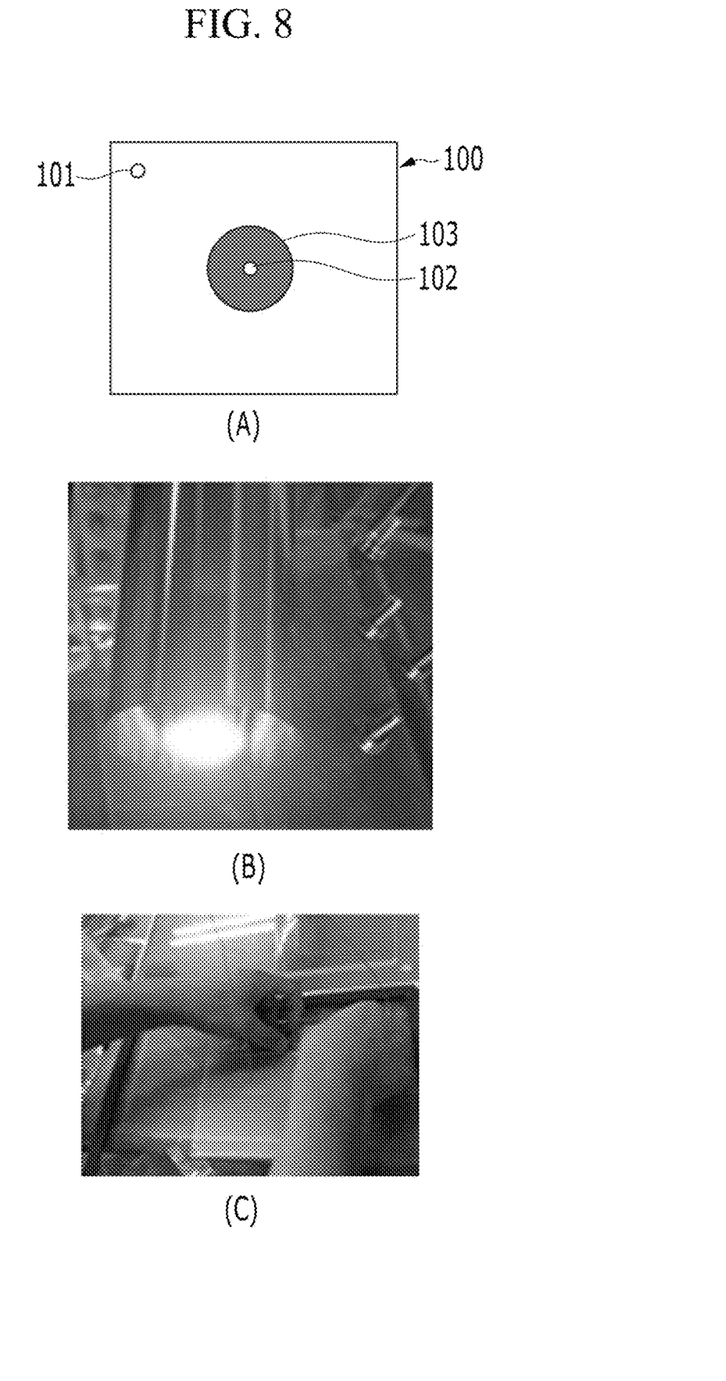
FIG. 8 shows photographs and a diagram illustrating an apparatus and a method for evaluating thermal conductivity of a graphene-ceramic hybrid coating layer according to one embodiment of the present invention.

100: PC (polycarbonate) substrate
101: measurement point of substrate edge temperature
102: thermocouple (center of PC substrate)
103: heating shape by heating source It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION

Hereinafter, embodiments of the present invention are described in further detail. However, these embodiments are exemplary, and this disclosure is not limited thereto.

The terms and words used in the specification and claims are not supposed to be construed in a conventional manner or on a dictionary basis, and the inventors are supposed to use the terms and words well matching with the technical concepts based on the principles that the concepts of the terms and words can be properly construed in order to describe the present invention in the best way.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about". A graphene-ceramic hybrid coating layer according to one embodiment of the present invention is a coating layer formed from graphene (RGO: reduced graphene oxide) and a ceramic sol solution. It is preferred that the content of graphene in the coating layer is about 0.001 wt % to about 1.8 wt % based on the total weight of the coating layer. When the graphene content in the graphene-ceramic hybrid coating layer is less than about 0.001 wt %, a coating layer having excellent thermal conductivity and high strength is not provided, and when the graphene content in the coating layer is more than about 1.8 wt %, uniformity of the graphene-ceramic hybrid sol solution for forming the coating layer is not secured, and uniformity and transparency of the coating layer is not secured. In particular, in order to provide a graphene-ceramic hybrid coating layer having excellent uniformity and transparency, uniformity of the graphene-ceramic hybrid sol solution for forming the coating layer is required. When the graphene content in the coating layer is maintained within the above ranges, such an effect may be expected. The graphene content ensuring uniformity and transparency of the graphene-ceramic hybrid coating layer is about 0.001 wt % to about 1.8 wt % based on the total weight of the coating layer. In addition, while thickness of graphene is a molecular unit, the diameter of graphene is only several micrometers. As such, graphene may have a problem of becoming wrinkled. Further, an excess of the graphene may be impurities, since a general ceramic sol has a high specific gravity and viscosity, and thus is mixed with a relatively soft graphene and ceramic. Accordingly, it is important to adjust the content of the graphene. When the graphene content is within the above range, the graphene and ceramic sol may be uniformly distributed in the graphene-ceramic hybrid sol solution. These facts may be expected without being bound to a specific theory. The ceramic may be any conventional ceramic material and, preferably, is selected from the group consisting of $SiO_2$, $Al_2O_3$, $Li_4Ti_5O_{12}$, $TiO_2$, $SnO_2$, $CeO_2$, $ZrO_2$, $V_2O_5$, $B_2O_3$, $BaTiO_3$, $Y_2O_3$, $WO_3$, MgO, CuO, ZnO, $AlPO_4$, AlF, $Si_3N_4$, AlN, TiN, WC, SiC, TiC, $MoSi_2$, $Fe_2O_3$, $GeO_2$, $Li_2O$, MnO, NiO, zeolite, and combinations thereof. For example, one example includes one or more of $TiO_2$, $SiO_2$, $CeO_2$, ZnO, $Al_2O_3$, and $SnO_2$.

According to another embodiment, a method for preparing a graphene-ceramic hybrid coating layer includes: mixing graphene, a first dispersing agent and a first non-aqueous based solvent to prepare a dispersion including the graphene, the first dispersing agent and the first non-aqueous based solvent; adding a mixed solution of a second non-aqueous based solvent and a ceramic precursor to the dispersion to prepare a mixture; mixing a second dispersing agent and water with the mixture to prepare a graphene-ceramic hybrid sol solution; and coating a substrate with the graphene-ceramic hybrid sol solution. According to various embodiments, the graphene may be formed by reducing graphene oxide, graphite oxide, or a mixture thereof by a reduction method. The reduction method may be selected from conventional reduction methods and, for example, may be a chemical reduction method, a thermal reduction method, or a combination thereof. For example, the chemical reduction method may be performed under a strong base such as hydrazine, and the thermal reduction method may be performed under an inert gas atmosphere at a high temperature. However, RGO prepared by reducing graphene oxide, graphite oxide, and the like is reported to not completely remove a part of the oxidizing groups on the surface. As such, since oxygen content (due to oxidizing groups on the surface) is generally less than or equal to about 5% relative to a carbon backbone, graphene (RGO) of the present invention includes less than or equal to about 5 wt % of oxygen content relative to the carbon backbone.

According to various embodiments, the process of mixing graphene, a first dispersing agent and a first non-aqueous based solvent to prepare the dispersion (also referred to herein as "first process") is a process in which graphene is dispersed alone before mixing the graphene dispersion with the ceramic sol solution. This is beneficial in order to remove water that is hydrogen-bonded with a hydrophilic functional group, for example a carboxyl group (—COOH) or a hydroxyl group (—OH), and in order to maximize graphene dispersion. According to various embodiments, while forming a ceramic sol, the sol may function as a first dispersing agent. In particular, after mixing the graphene, first dispersing agent, and first non-aqueous based solvent, the process of preparing the dispersion may further include a process of washing the resultant with a non-aqueous based solvent, and mechanical-dispersion process for treating the same. Further, after mixing the first dispersing agent and the first non-aqueous based solvent, the method may include washing the resultant with a non-aqueous based solvent before the mechanical dispersion treatment. When the washing is performed with the first non-aqueous based solvent, the resultant may be in a form more suitable for a subsequent process. In particularly, considering a subsequent process, the same kinds of non-aqueous based solvent as the first non-aqueous based solvent may be preferably used in the washing process. According to various embodiments, the process of washing the first non-aqueous based solvent is performed to thoroughly remove moisture ($H_2O$) adsorbed on the surface of the graphene. This process may be a simple washing process, or may be performed through more complex procedures such as an ultrasonication dispersion treatment or after an ultrasonication dispersion treatment. The washing process may be performed as many times as needed. By carrying out the washing process with the non-aqueous based solvent, a degree of moisture removal at the surface of the graphene may have a beneficial effect on long-time stability of the sol solution. Therefore, inclusion of a method of performing washing and/or a washing degree may control moisture and, thus, may improve resultant properties. Specifically, when moisture is removed, a sol stability effect may be maximized.

According to an embodiment for the present invention, in the first process, sol stability may be reduced by added moisture even if only a small amount of moisture is added. In particular, even if only a small amount of moisture is adsorbed on the graphene, stability of the entire graphene-ceramic hybrid mixed sol may be dramatically reduced because there is serious interface instability at an interface with the sol. The mechanical dispersion treatment may be performed by any known method, such as ultrasonication, stirring, a shear stress (shearing force) application method, a method of using a homogenizer, or a combination thereof. Further, because the dispersion is maximized by simultaneous dispersion with the dispersing agent and dispersion by mechanical dispersion treatment, it is possible to maintain dispersion stability maintained until the graphene is included in the mixture of the first graphene dispersing agent and non-aqueous based solvent at a maximum amount of about 5 wt % based on a solid content. When a network of a ceramic precursor is formed (preparation reaction of a sol solution), ions derived from the ceramic precursor, chemical species, and the like are aggregated on the graphene to thereby reduce surface non-uniformity to a certain degree.

According to preferred embodiments, the first dispersing agent is specifically polyethylene glycol (PEG), glycerol, hydrochloric acid (HCl), acetic acid, formic acid, citric acid, a polymer, or a combination thereof. One or more additives, such as polyethylene glycol, glycerin, glucose, a polymer, and a mixture thereof may be further included, in addition to the first dispersing agent. Further, one or more other additives may be included, such as a binder dispersing agent, a curing agent, a polymer, an inorganic-based powder, and the like. According to preferred embodiments, the first non-aqueous based solvent is selected form an amphiphilic solvent, a water-soluble solvent except water, a non-water-soluble solvent, a polar solvent, a nonpolar solvent, or a mixed solvent, and specifically IPA (iso-propyl alcohol), ethanol, acetone, methylethylketone, methyl alcohol, ethyl alcohol, isopropyl alcohol, acetylacetone, butyl alcohol, ethylene glycol, polyethylene glycol, tetrahydrofuran, dimethylformamide, dimethyl acetamide, N-methyl-2-pyrrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, dimethylsulfoxide, or a mixed solvent thereof.

In the subsequent process of adding a mixed solution of a second non-aqueous based solvent and a ceramic precursor to the dispersion to prepare a mixture, a dispersing agent and or additive may be omitted. According to various embodiments, the second non-aqueous based solvent may be added as a dilution solvent or a sol stabilization solvent. Further, the second non-aqueous based solvent may be the same as the first non-aqueous based solvent and may be either homogeneous or heterogeneous, and may be a mixed solvent. According to preferred embodiments, the ceramic precursor may be selected from titanium iso-propoxide (TTIP) and tetramethyl orthosilicate (TMOS). Preferably, the dispersion including graphene and the mixed solution of the ceramic precursor is prepared such that they are dispersed separately and mixed to prepare a sol solution. This allows for the ceramic precursor molecule species to be maximally dispersed and adsorbed on a sheet-shaped nanostructure, graphene, to thereby form a uniform graphene-ceramic sol solution.

In the next process of mixing a second dispersing agent and water with the mixture to prepare a sol solution for a coating layer of a graphene-ceramic hybrid composition, the second dispersing agent may be the same material as the first dispersing agent, or a different material, and may be a mixed material. For example, when the first dispersing agent is polyethylene glycol, the second dispersing agent may be polyethylene glycol or hydrochloric acid.

Figure 9:
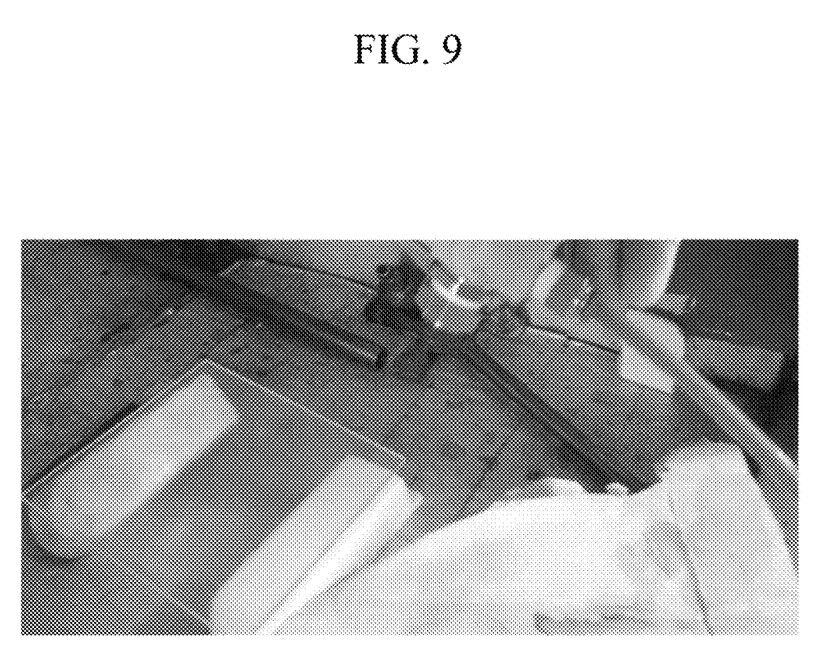
FIG. 9 is a photograph showing a principle of forming a graphene-ceramic hybrid coating layer using spray coating according to one embodiment of the present invention.

After the sol solution for the coating layer of the graphene-ceramic hybrid composition is prepared, a substrate is coated with the sol solution to prepare the graphene-ceramic hybrid coating layer. The coating process may be performed by any general coating method, and according to various embodiments, is performed specifically dip coating, spin coating, spray coating, paint coating, bar coating, flow coating, roll coating, or a combination thereof. According to preferred embodiments, the coating method is dip coating, spin coating, or spray coating. For example, the coating process according to one embodiment of the invention may be performed using spray coating as shown in FIG. 9, regardless of the kinds or shapes of the substrates to be coated (e.g., such as a large area, a curved substrate, and the like). However, the coating process it is not limited thereto.

According to another embodiment of the present invention, a graphene-ceramic hybrid coating layer prepared using the above preparation method is provided. In the graphene-ceramic hybrid coating layer prepared according to the above preparation method, the graphene content in the graphene-ceramic hybrid coating layer is preferably about 0.001 wt % to about 1.8 wt % based on the total weight of the graphene-ceramic hybrid coating layer.

In addition, the present invention includes applying the coating layer to an automobile headlamp. Such coating, in particular, is expected to suppress fogging due to thermal conductivity by lamp heat due to effects of the present invention, for example excellent thermal conductivity as described above. As one specific industrial application of the present coating, the coating may be applied to a lens (PC curved substrate) of an automobile head lamp to reduce fogging problems.

Hereinafter, specific exemplary embodiments of the present invention are described. However, the specific exemplary embodiments are merely used to exemplarily illustrate the present invention in more detail, and are not to be seen as limiting the present invention. Furthermore, what is not described in this disclosure may be sufficiently understood by those skilled in the art who have knowledge in this field.

Preparation Example 1

Preparation of Graphene Oxide 10 g of natural graphite and 7.5 g of sodium nitrate were put in a reactor and 621 g of 96% sulfuric acid was slowly added while stirring. After the three materials were sufficiently mixed, 45 g of manganese peroxide was added. Because the manganese peroxide has a potential for explosion and generates heat and gases when reacting with strong sulfuric acid, it is gradually added over the course of 1 hour little by little. After adding the manganese peroxide, the resultant was stirred at room temperature and reacted for 4 to 6 days. Then, 1 L of 5% sulfuric acid was added. Because a large amount of heat and gases may be generated by this process, the reactor was suitably cooled and the sulfuric acid was added slowly over 1 hour, and then the resultant was held at room temperature for one day while being stirred. After one day, 30 g of 30% hydrogen peroxide was slowly added and reacted for 2 hours. In order to remove a large amount of sulfuric acid and hydrogen peroxide in the resulting product, washing and centrifugation were performed repeatedly. The process was performed as follows: centrifugation was performed to remove a supernatant, a mixed solution including 3% sulfuric acid and 0.5% hydrogen peroxide at a ratio of 1:1 was added to the remaining precipitate, and the resultant was sufficiently agitated and centrifuged and a supernatant was removed. Then, the mixed solution was added to the remaining precipitate and mixed. These processes were repeated 15 times, and then the mixed solution was replaced by water 5-6 times to obtain an aqueous graphene-oxide (GO) slurry.

A GO slurry is generally a material that is produced by acid treatment of graphite and purification processes, and thus the GO slurry in the present invention may be a generally-known sheet-shaped graphene oxide or graphite oxide without limitation. In general, an aqueous GO slurry has a solid content of 2 to 8 wt % based on the total weight of the centrifuged slurry.

Preparation Example 2

Preparation of Thermally Reduced Graphene

Reduced graphene oxide (RGO) was prepared by vacuum-drying the aqueous graphene-oxide slurry obtained according to Preparation Example 1 at 100° C. for 24 hours and heat-treating it at 600° C. under a $N_2$ atmosphere for 30 minutes.

Preparation Example 3

Preparation of Chemically Reduced Graphene

Reduced graphene oxide powder was prepared by adding hydrazine to the aqueous graphene oxide slurry prepared according to Preparation Example 1, reacting the mixture for 24 hours, and centrifuging/washing/drying a precipitate obtained therefrom.

Example 1

Preparation of Graphene-$TiO_2$ Hybrid Sol Solution 10 mg of the thermally reduced graphene prepared according to Preparation Example 2 was put in a 500 mL plastic bottle, 200 ml of IPA was added thereto, 20 g of PEG was added thereto, and the mixture was ultrasonication-dispersed for 10 minutes. 50 ml of acetylacetone was added to the IPA-dispersed graphene (GP) dispersion, and 50 ml of a $TiO_2$ ceramic precursor reagent (titanium iso-propoxide (TTIP)) was added thereto, and the mixture was agitated for greater than or equal to 30 minutes to prepare "reactant A". The agitation made the TTIP ion species and chemical species sufficiently uniformly contact the surface of a GP sheet-shaped structure, and provided uniformity of a sol prepared in the next step. 150 ml of water, 10 g of PEG (polyethylene glycol), and 1 ml of HCl were added to the reactant A, and the mixture was uniformly agitated for 90 minutes, to prepare a GP-$TiO_2$ hybrid sol solution.

Preparation of Graphene-$TiO_2$ Hybrid Coating Layer

The GP-$TiO_2$ hybrid sol solution was spin-coated on a glass substrate that was plasma-treated on the surface (800 rpm). The spin-coated layer was vacuum-dried at room temperature and heat-treated at 180° C. for 1 hour, forming a GO-$TiO_2$ hybrid coating layer. Herein, the graphene content (or content of carbon) of the coating layer was about 0.01-0.03 wt %.

Example 2

Preparation of Graphene-$TiO_2$ Hybrid Sol Solution 10 mg of the thermally reduced graphene according to Preparation Example 2 was put in a 500 mL plastic bottle, 150 ml of DMF was added thereto, 15 g of PEG was added thereto, and the mixture was ultrasonication-dispersed for 10 minutes. 50 ml of acetylacetone was added to the GP dispersion dispersed in DMF, 50 ml of titanium iso-propoxide (TTIP) as a $TiO_2$ ceramic precursor reagent was added thereto, and the mixture was agitated for greater than or equal to 30 minutes (a reactant A). This process made the TTIP ion species and chemical species sufficiently uniformly contact the surface of a GP sheet-shaped structure and provided uniformity of a sol prepared in the next step. 150 ml of water, 20 g of PEG (polyethylene glycol), and 1 ml of HCl were added to the reactant A, and the mixture was uniformly reacted (agitated) for 90 minutes, thereby preparing a GP-$TiO_2$ hybrid sol solution. This hybrid sol was not precipitated but was uniformly coated without a stain.

Preparation of Graphene-$TiO_2$ Hybrid Coating Layer

The GP-$TiO_2$ hybrid sol solution was spin-coated on a glass substrate that was plasma-treated on the surface (800 rpm). The spin-coating layer was vacuum-dried at room temperature and then heat-treated at 180° C. for 1 hour, thereby forming a GO-$TiO_2$ mixed layer. Herein, the graphene content (or content of carbon) of the coating layer was about 0.01-0.03%.

Example 3

Preparation of Graphene-$TiO_2$ Hybrid Sol Solution 15 mg of the chemically reduced graphene preparation according to Example 3 was put in a 500 mL plastic bottle, 150 ml of IPA was added thereto, 20 g of PEG was added thereto, and the mixture was ultrasonication-dispersed for 10 minutes. 70 ml of IPA, 30 ml of DMF, and 50 ml of acetylacetone were additionally added to the GP dispersion dispersed in IPA, 50 ml of titanium iso-propoxide (TTIP) as a $TiO_2$ ceramic precursor reagent was added thereto, and the mixture was agitated for greater than or equal to 30 minutes to prepare "reactant A". This process made the TTIP ion species and chemical species sufficiently uniformly contact the surface of a GP sheet-shaped structure and provided uniformity of a sol prepared in the next step. 150 ml of water, 20 g of PEG (polyethylene glycol), 0.7 ml of HCl, 0.3 ml of acetic acid, and 0.5 ml of citric acid were added to the reactant A, and the mixture was uniformly reacted (agitated) for 90 minutes, thereby preparing a GP-$TiO_2$ hybrid sol solution. This hybrid sol was not precipitated but was uniformly coated without a stain.

Preparation of Graphene-$TiO_2$ Hybrid Coating Layer

The GP-$TiO_2$ hybrid sol solution was spray-coated on a PC (polycarbonate) substrate that was plasma-treated on the surface, and the spray coating layer was vacuum-dried at 50° C. and heat-treated on the surface by repeatedly applying instant thermal impacts with an IR lamp. The heat treatment was performed at 300° C. and the exposure time was 3 seconds, and the treatment was repeatedly performed. The treatment repetitions were performed when the temperature of the substrate dropped sufficiently to room temperature. Herein, the lower part of the substrate was water-cooled (or air cooled), so that the temperature of the substrate was less than 100° C.

Example 4

Preparation of Graphene-$SiO_2$ Hybrid Sol Solution 15 mg of the chemically reduced graphene prepared according to Preparation Example 3 was put in a 500 mL plastic bottle, 150 ml of IPA was added thereto, 10 g of PEG was added thereto, and the mixture was ultrasonication-dispersed for 10 minutes. 100 ml of ethanol was added thereto, then 10 ml of TMOS (tetramethyl orthosilicate) was added thereto, and the resulting mixture was agitated for greater than or equal to 30 minutes. At this time, the TMOS did not yet become a sol and uniformly contacted the interface of the GP. 50 mL of water and 3 g of PEG were added to the solution, and the mixture was agitated for one hour, preparing a GP-$SiO_2$ hybrid sol solution.

Preparation of Graphene-$SiO_2$ Hybrid Coating Layer

The GP-$SiO_2$ hybrid sol solution was spray-coated on a glass substrate that was plasma-treated on the surface, and the spray coating layer was vacuum-dried at 80° C. under a nitrogen atmosphere and heat-treated at 300° C. for 3 hours. Herein, a GP content (content of carbon) of the obtained hybrid layer was about 1.8%.

Comparative Example 1

Ceramic Sol

A $TiO_2$ sol solution was prepared by using 50 mL of IPA, adding 50 mL of titanium iso-propoxide (TTIP) as a $TiO_2$ ceramic precursor reagent thereto, agitating the mixture for greater than or equal to 30 minutes, adding 10 mL of water, 10 g of PEG (polyethylene glycol), and 1 mL of HCl thereto, and then uniformly reacting (agitating) the resulting mixture for 90 minutes.

Comparative Example 2

Simple Mixing

A $TiO_2$ sol solution was prepared by using 50 mL of acetylacetone, adding 50 mL of titanium iso-propoxide (TTIP) as a $TiO_2$ ceramic precursor reagent thereto, agitating the mixture for greater than or equal to 30 minutes, adding 10 mL of water, 10 g of PEG (polyethylene glycol), and 1 mL of HCl thereto, and uniformly reacting (agitating) the resulting mixture for 90 minutes. 10 mg of the graphene prepared according to Preparation Example 2 was added to the $TiO_2$ sol solution to obtain a physically simple mixture.

Evaluation 1

Figure 1:
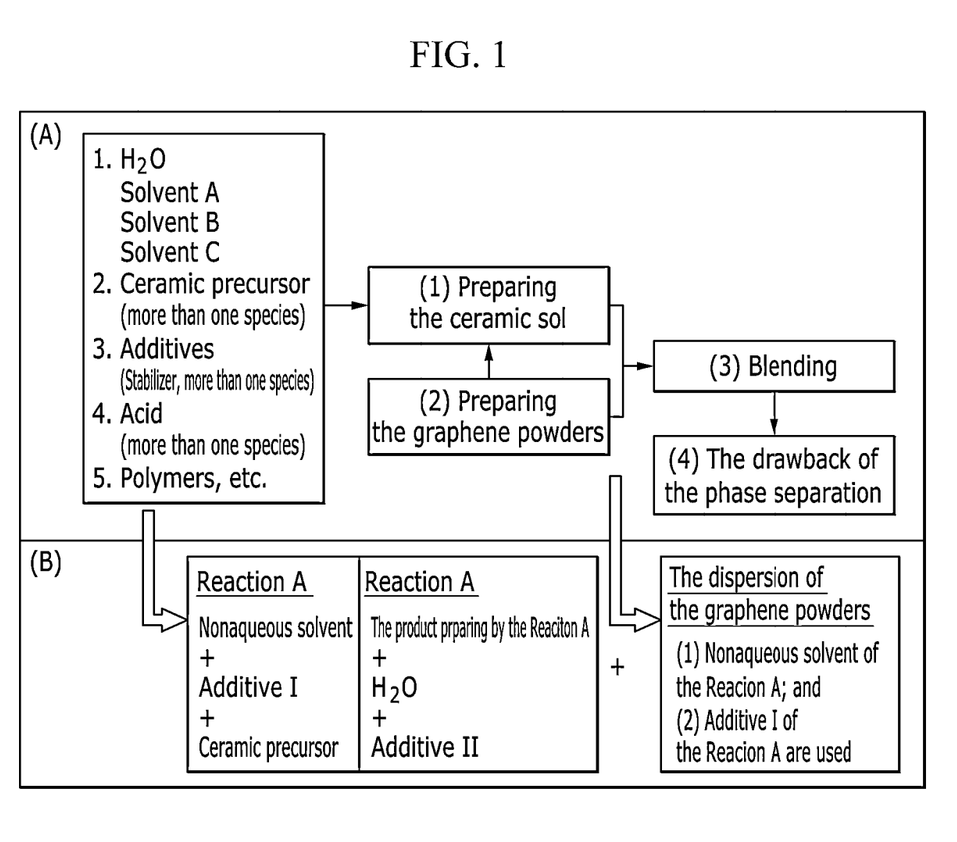
FIG. 1 schematically shows differences between methods for preparing a graphene-ceramic hybrid sol solution according to the conventional art and one embodiment of the present invention.
Figure 2:
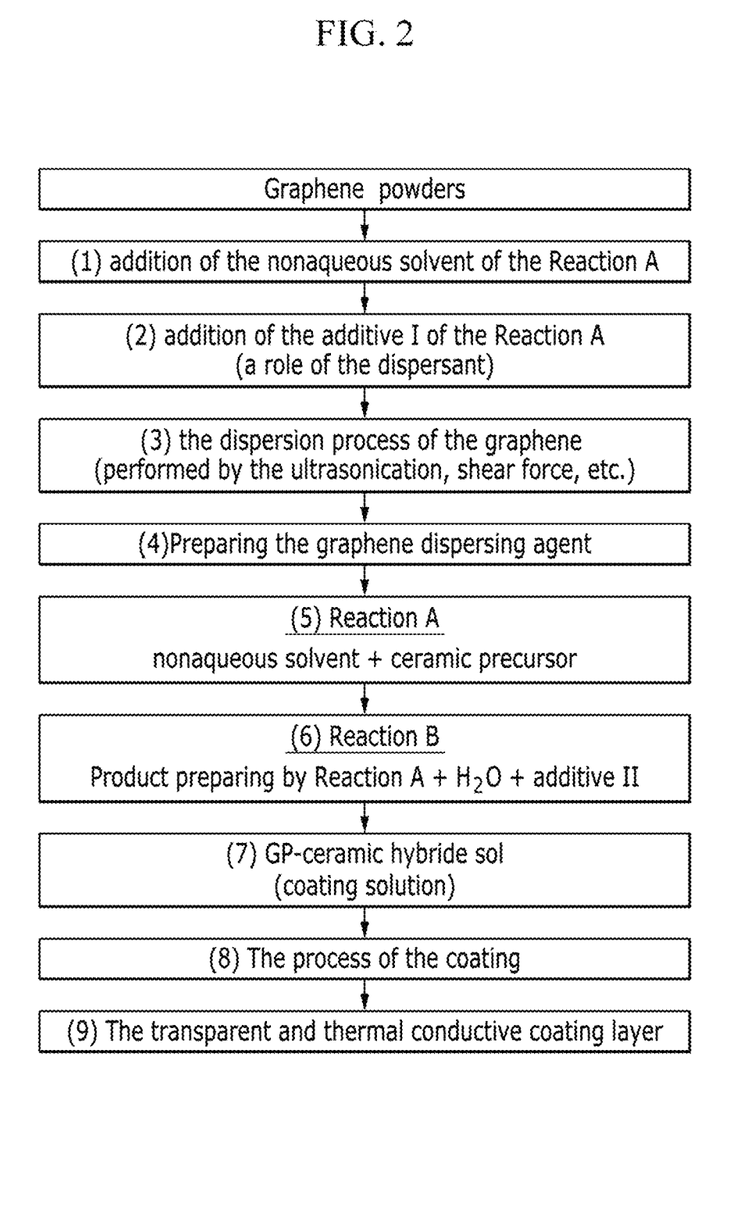
FIG. 2 schematically shows a graphene-ceramic hybrid sol solution preparation method according to one embodiment of the present invention.
Figure 3:
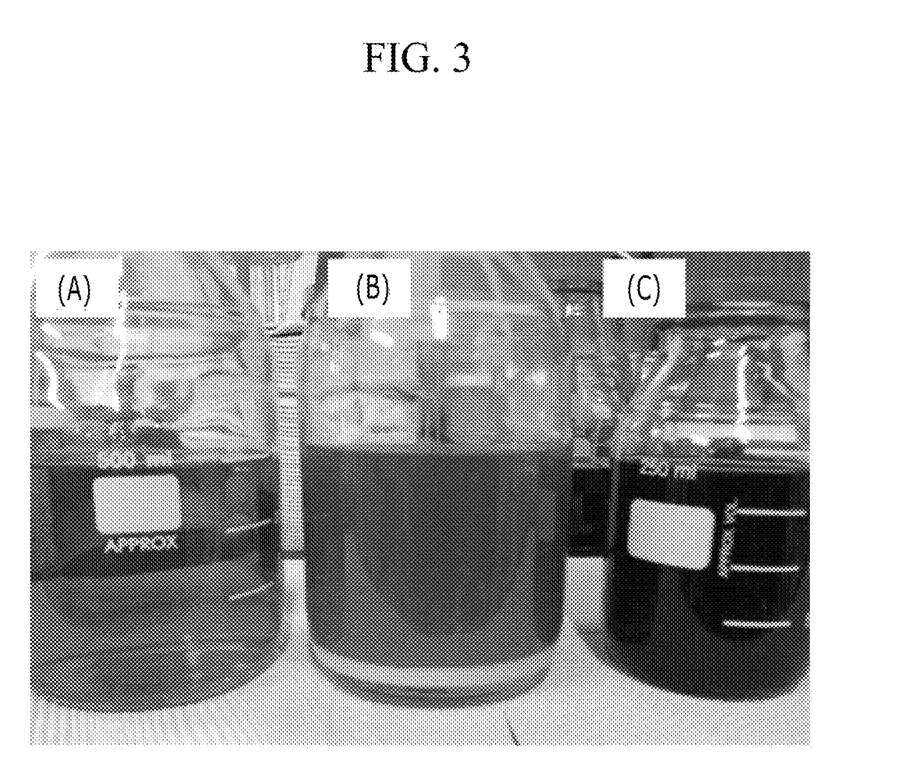
FIG. 3 shows a photograph exhibiting stability and uniformity of graphene-ceramic hybrid sol solutions for forming the coating layer according to one embodiment of the present invention and Comparative Examples 1 and 2.

Uniformity (Stability) of Sol Solution for Graphene-Ceramic Hybrid Coating Layer Uniformity (stability) of a sol solution for a graphene-ceramic hybrid coating layer of (C) according to one embodiment of the present invention and a sol solution for a graphene-ceramic hybrid coating layer (B) prepared by simply mixing a graphene dispersion and a ceramic sol solution according to Comparative Example 2 was evaluated by examining photographs of each sol solution shown in FIG. 3.

In particular, FIG. 3 shows a photograph exhibiting stability and uniformity of sol solutions for a graphene-ceramic hybrid coating layer according to one embodiment as compared with the sol solutions according to Comparative Examples 1 and 2. FIG. 3 (A) shows the sol solution for the graphene-ceramic hybrid coating layer according to Comparative Example 1, and FIG. 3 (B) shows the sol solution for the graphene-ceramic hybrid coating layer according to Comparative Example 2. FIG. 3 (C) shows the sol solution for a graphene-ceramic hybrid coating layer according to one embodiment of the present invention.

Referring to FIG. 3 (B), the sol solution prepared as a simple mixture according to Comparative Example 2 exhibits two serious problems. (1) The graphene dispersion is hydrophobic and is not well mixed with a sol solution and, thus, mostly floats on top of the sol solution, resulting in non-uniformly dispersion in the sol solution. (2) In an ultrasonication step for dispersing a mixed solution of the graphene dispersion and the sol solution, moisture adsorbed on the surface of the graphene had an interface reaction with the sol (the moisture showed a maximized concentration on the interface) and extremely deteriorated interface properties, the mixed solution of the graphene dispersion and the sol solution became cloudy, and a precipitate was produced therein. The cloudiness was examined with the naked eye to compare it with the pure sol solution (A). On the other hand, the sol solution for a graphene-$TiO_2$ hybrid coating layer according to one embodiment of the present invention was uniform, as shown in FIG. 3 (C), and this uniform solution had a positive influence on uniformity and stability of a coating layer thus formed. The uniformity and stability were inherent effects of the present invention that could not be obtained from a conventional simply-mixed solution.

Evaluation 2

Uniformity of Graphene-Ceramic Hybrid Coating Layer

Figure 4:
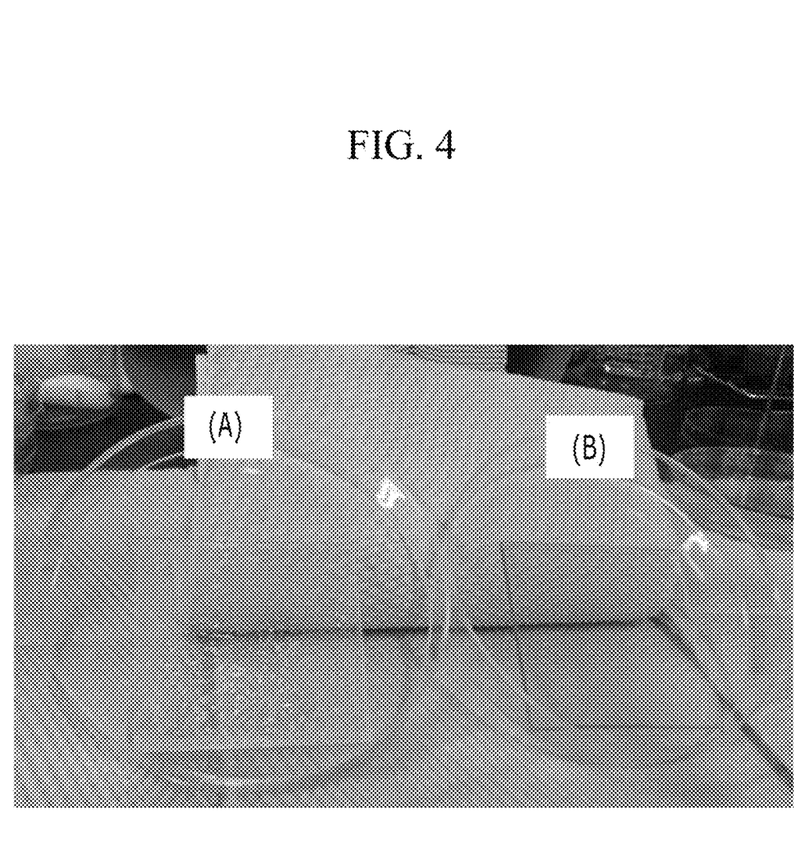
FIG. 4 shows a photograph exhibiting uniformity of the graphene-ceramic hybrid coating layers according to one embodiment of the present invention and Comparative Example 2.

Uniformity of a graphene-ceramic hybrid coating layer according to one embodiment of the present invention and the graphene-ceramic hybrid coating layer formed by the simple mixture of a graphene dispersion and a ceramic sol solution according to Comparative Example 2 was evaluated by respectively spin-coating each of the sol solutions on a PC (polycarbonate) substrate as shown in FIG. 4.

FIG. 4 shows a photograph exhibiting uniformity of the graphene-ceramic hybrid coating layers according to one embodiment and Comparative Example 2. FIG. 4 (A) shows the coating layer according to Comparative Example 2, and FIG. 4 (B) shows the coating layer according to one embodiment of the present invention. As shown, while the coating layer was non-uniform or peeled off in FIG. 4(A), the coating layer according to one embodiment of the present invention showed excellent uniformity and transparency as shown in FIG. 4(B).

Evaluation 3

Storage Stability of Sol Solution for Graphene-Ceramic Hybrid Coating Layer

Storage stability of a sol solution for a graphene-ceramic hybrid coating layer according to one embodiment of the present invention was evaluated by preparing two sol solutions, and in one case washing it and in the other case not washing it with a non-aqueous based solvent, and storing the two solutions in a refrigerator for 3 days.

Figure 5:
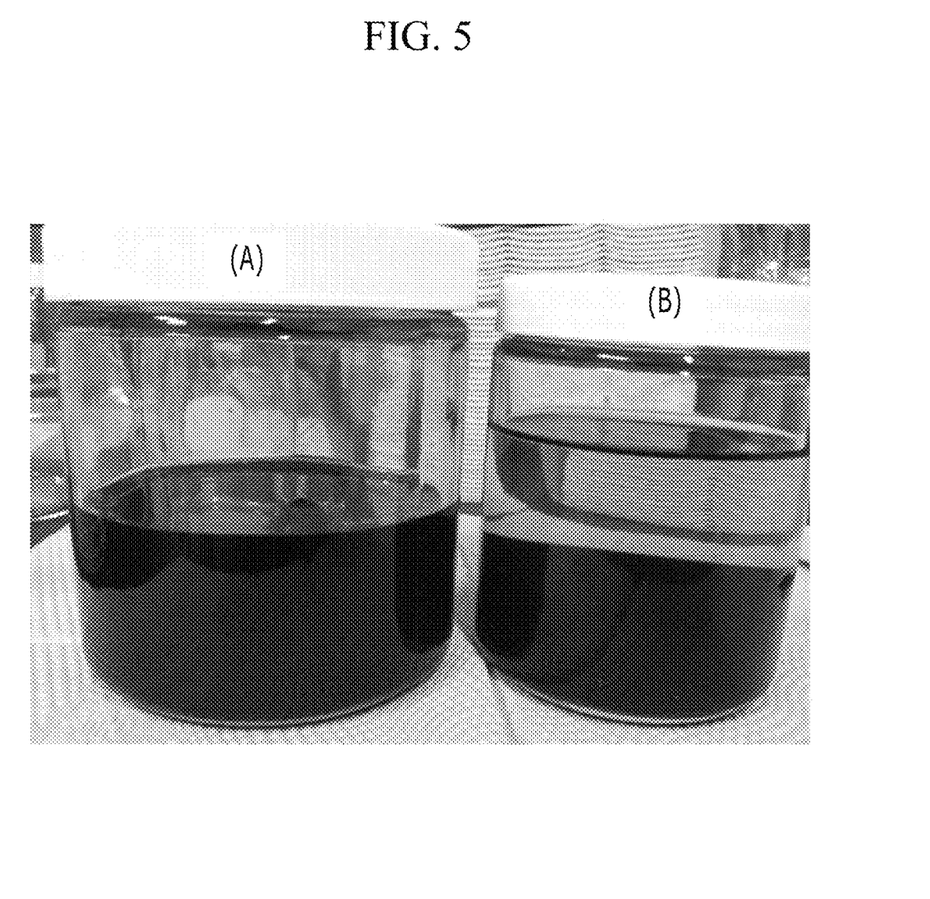
FIG. 5 shows a photograph exhibiting storage stability of a graphene-ceramic hybrid sol solution for forming the coating layer according to one embodiment of the present invention.

FIG. 5 shows a photograph exhibiting storage stability of the sol solution for a graphene-ceramic hybrid coating layer according to one embodiment of the present invention. FIG. 5 (A) shows a sol solution for a graphene-ceramic hybrid coating layer prepared by dispersing and washing graphene with a non-aqueous based solvent more than once according to one embodiment of the present invention, and FIG. 5 (B) shows a sol solution for a graphene-ceramic hybrid coating layer prepared by using graphene without dispersing and washing the graphene with a non-aqueous based solvent according to another embodiment of the present invention. Even though the two sol solutions for the graphene-ceramic hybrid coating layer showed no stability difference depending on the washing treatment due to a small amount of difference of adsorbed moisture when prepared, referring to FIG. 5, the sol solution for the graphene-ceramic hybrid coating layer washed more than once was excellent in terms of storage stability, as shown in FIG. 5 A. This result suggests that the present invention may provide a sol solution for a graphene-ceramic hybrid coating layer having improved storage stability.

Figure 6:
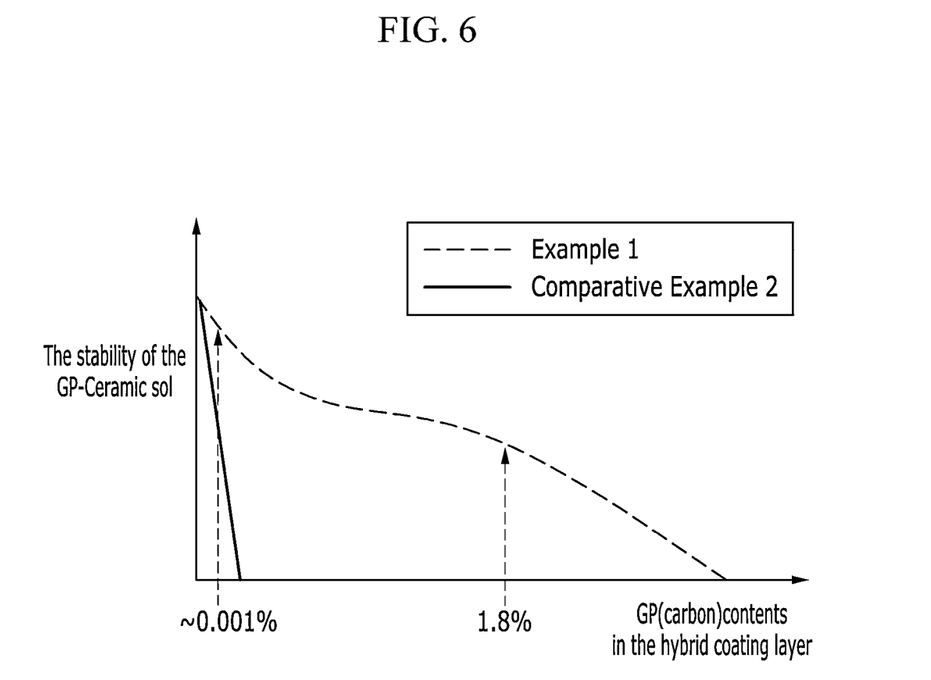
FIG. 6 is a graph showing stability of graphene-ceramic hybrid sol solutions according to Example 1 and Comparative Example 2.

FIG. 6 is a graph showing principles of the present invention based on comparison of principles of the conventional method and the present invention by evaluating cloudiness and precipitation of a solution, and stability and long-term storage stability of a coating layer. Referring to FIG. 6, the graphene-ceramic hybrid sol solution according to Example 1 maintained safety to a degree when the graphene content included in a graphene-ceramic hybrid layer was in a range of 0.001 wt % to 1.8 wt %. On the other hand, a graphene-ceramic hybrid sol solution showed sharply deteriorated safety as the graphene content included in a graphene-ceramic hybrid layer was below 0.001 wt %.

Evaluation 4

Transparency of Graphene-Ceramic Hybrid Coating Layer

Figure 7:
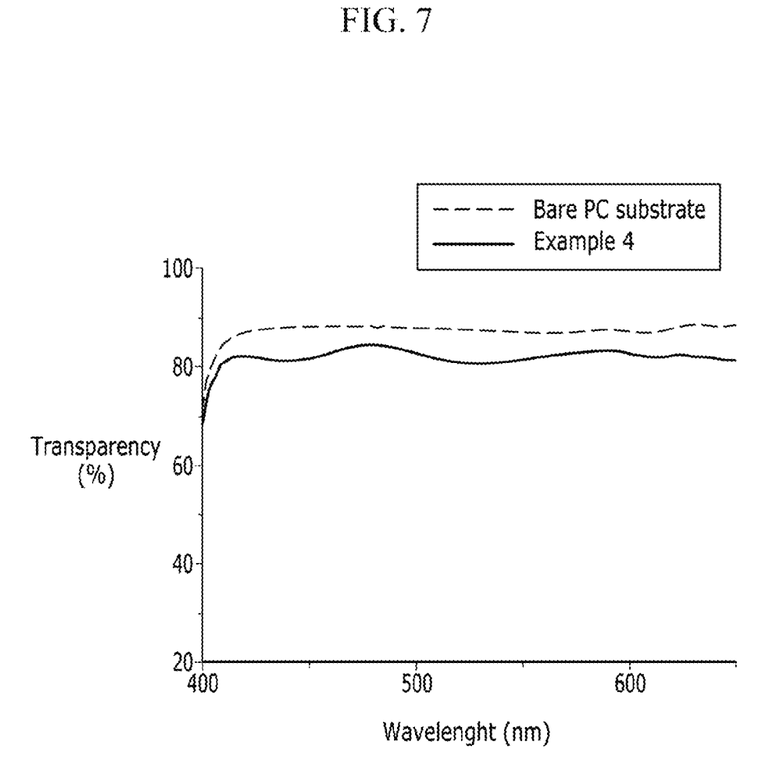
FIG. 7 is a graph showing transparency of the graphene-ceramic hybrid coating layer according to one embodiment of the present invention.

A UV-Vis spectrophotometer (JASCO, V-530) was used to measure transparency of a graphene-$SiO_2$ hybrid coating layer, and the result is provided in FIG. 7. Referring to FIG. 7, the graphene-$SiO_2$ hybrid coating layer showed transmittance of 81% at a wavelength of 550 nm, and herein, included graphene in an amount of 0.5 wt % at a thickness of 1100 nm.

Evaluation 5

Thermal Conductivity of Graphene-Ceramic Hybrid Coating Layer

Thermal conductivity of a transparent of a graphene-ceramic hybrid coating layer prepared according to the present invention was evaluated by using a homemade thermal conductivity measuring apparatus.

FIG. 8 shows photographs and a diagram illustrating the apparatus and a method for evaluating thermal conductivity of a graphene-ceramic hybrid coating layer according to one embodiment. In particular, the apparatus used for evaluating thermal conductivity of a graphene-ceramic hybrid coating layer is illustrated in FIG. 8 (A). A thermocouple (TC2) in the center 102 of a PC (polycarbonate) substrate 100 (with a size of 10 cm×10 cm and a thickness of 2 mm) was heated up to 120° C. by using a halogen lamp as a heating source 103 (a heating shape: a circle with a diameter of 5 cm), and simultaneously, a temperature on the measurement point of substrate edge temperature TC1 101 of the substrate was measured. FIG. 8 (B) is a photograph showing the halogen lamp heating source, and FIG. 8 (C) is a photograph showing a process of attaching TC1 and TC2 to the substrate.

As a result of comparing and examining a bare PC substrate, a ceramic sol coating layer formed of a pure sol solution, and graphene-ceramic hybrid coating layer according to one embodiment of the present invention by using the apparatus in FIG. 8, a 1000 nm-thick substrate including 0.1% of graphene showed greater than or equal to about 4 times improved surface thermal conductivity than the substrate before being coated with a graphene-$TiO_2$ ceramic hybrid coating layer. In addition, the 1000 nm-thick substrate including 0.1% of graphene showed greater than or equal to about twice improved surface thermal conductivity than a substrate coated with a ceramic sol solution according to Comparative Example 1.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for preparing a graphene-ceramic hybrid coating layer, comprising:
   mixing graphene, a first dispersing agent and a first non-aqueous based solvent to prepare a dispersion including the graphene, first dispersing agent and first non-aqueous based solvent and which excludes water;
   adding a mixed solution of a second non-aqueous based solvent and a ceramic precursor to the dispersion to prepare a mixture;
   mixing a second dispersing agent and water with the mixture to prepare a graphene-ceramic hybrid sol solution; and
   coating a substrate with the graphene-ceramic hybrid sol solution.

2. The method of claim 1, wherein the process of preparing the dispersion further comprises performing a mechanical dispersion treatment after mixing the graphene, first dispersing agent, and first non-aqueous based solvent.

3. The method of claim 2, wherein after mixing the first dispersing agent and the first non-aqueous based solvent, the method further comprises washing the resultant with a non-aqueous based solvent before the mechanical dispersion treatment.

4. The method of claim 2, wherein the mechanical dispersion treatment is performed by ultrasonication, stirring, a shear stress (shearing force) application method, a method of using a homogenizer, or a combination thereof.

5. The method of claim 1, wherein the first dispersing agent and second dispersing agent are each independently selected from the group consisting of polyethylene glycol (PEG), glycerol, hydrochloric acid (HCl), acetic acid, formic acid, citric acid, a binder, and a combination thereof.

6. The method of claim 1, wherein the first non-aqueous based solvent and the second non-aqueous based solvent are each independently selected from the group consisting of an amphiphilic solvent, a water-soluble solvent except water, a non-water-soluble solvent, a polar solvent, a nonpolar solvent, and a combination thereof.

7. The method of claim 1, wherein the first non-aqueous based solvent and the second non-aqueous based solvent are each independently selected from the group consisting of isopropyl alcohol, ethanol, acetone, methylethylketone, methyl alcohol, ethyl alcohol, isopropyl alcohol, acetylacetone, butyl alcohol, ethylene glycol, polyethylene glycol, tetrahydrofuran, dimethylformamide, dimethyl acetamide, N-methyl-2-pyrrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, dimethylsulfoxide, and a combination thereof.

8. The method of claim 1, wherein the process of preparing the dispersion further comprises adding one or more additives selected from the group consisting of polyethylene glycol, glycerin, glucose, a binder, and a combination thereof.

9. The method of claim 1, wherein the graphene is dispersed in an amount of about 0.001 wt % to about 5 wt % based on a solid content of a mixture including the graphene, first dispersing agent, and non-aqueous based solvent.

10. The method of claim 1, wherein the coating process is performed by dip coating, spin coating, spray coating, paint coating, bar coating, flow coating, roll coating, or a combination thereof.

* * * * *